United States Patent
Nishi et al.

(10) Patent No.: US 10,967,888 B2
(45) Date of Patent: Apr. 6, 2021

(54) ON-BOARD APPARATUS AND GROUND SYSTEM

(71) Applicant: KYOSAN ELECTRIC MFG. CO., LTD., Yokohama (JP)

(72) Inventors: Toshifumi Nishi, Yokohama (JP); Tamotsu Yokoyama, Yokohama (JP); Tomonori Itagaki, Kawasaki (JP); Kenji Mizuno, Sagamihara (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 369 days.

(21) Appl. No.: 16/185,276

(22) Filed: Nov. 9, 2018

(65) Prior Publication Data
US 2019/0077426 A1 Mar. 14, 2019

Related U.S. Application Data

(63) Continuation of application No. PCT/JP2016/064108, filed on May 12, 2016.

(51) Int. Cl.
*B61L 3/00* (2006.01)
*B61L 23/18* (2006.01)
(Continued)

(52) U.S. Cl.
CPC .............. *B61L 3/006* (2013.01); *B61B 1/02* (2013.01); *B61L 3/16* (2013.01); *B61L 15/0027* (2013.01);
(Continued)

(58) Field of Classification Search
CPC ........ B61L 3/006; B61L 3/16; B61L 15/0027; B61L 15/0072; B61L 23/18;
(Continued)

(56) References Cited

U.S. PATENT DOCUMENTS 7,222,003 B2 * 5/2007 Stull ................... B61L 15/0027
701/19
9,026,283 B2 * 5/2015 Baldwin ............... B61L 29/282
701/19
(Continued)

FOREIGN PATENT DOCUMENTS

CN 102939233 A 2/2013
CN 103946099 A 7/2014
(Continued)

OTHER PUBLICATIONS

Shang Shunyi, Brief Analysis of rescue coupling operation of electric passenger-train of Wuxi Metro Line 2, China New Technologies and Products, Dec. 31, 2015, p. 152, vol. 5.

*Primary Examiner* — Peter D Nolan
*Assistant Examiner* — Luke Huynh
(74) *Attorney, Agent, or Firm* — Muncy, Geissler, Olds & Lowe, P.C.

(57) ABSTRACT

At an on-board control unit of an on-board apparatus, a coupling detecting unit detects coupling of a failure train with respect to the own train. Then, in the case where detection is performed by the coupling detecting unit, a train occupancy range calculating unit updates train length information using the number of vehicles of the failure train and uses the updated train length information to calculate train occupancy range information. Further, a traveling control unit controls traveling and stop of the own train as a series of coupled trains in the case where detection is performed by the coupling detecting unit.

7 Claims, 12 Drawing Sheets

(51) Int. Cl.
*B61L 15/00* (2006.01)
*B61B 1/02* (2006.01)
*B61L 27/00* (2006.01)
*B61L 3/16* (2006.01)
*B61L 25/02* (2006.01)
*H04W 4/42* (2018.01)

(52) U.S. Cl.
CPC ........... *B61L 15/0072* (2013.01); *B61L 23/18* (2013.01); *B61L 25/025* (2013.01); *B61L 27/0038* (2013.01); *B61L 27/0077* (2013.01); *B61L 2205/02* (2013.01); *H04W 4/42* (2018.02)

(58) Field of Classification Search
CPC ............... B61L 25/025; B61L 27/0038; B61L 27/0077; B61B 1/02
USPC .......................................................... 701/19
See application file for complete search history.

(56) References Cited

U.S. PATENT DOCUMENTS

| | | |
|---|---|---|
| 9,216,749 B2 | 12/2015 | Itagaki et al. |
| 9,254,854 B2 | 2/2016 | Bode et al. |
| 2005/0133673 A1* | 6/2005 | Sugita ................. B61L 27/0038 246/167 R |
| 2011/0029166 A1 | 2/2011 | Iga et al. |
| 2014/0350767 A1* | 11/2014 | Fries ................... B61L 15/0027 701/23 |
| 2015/0251676 A1* | 9/2015 | Golden ............... B61L 27/0038 701/19 |

FOREIGN PATENT DOCUMENTS

| | | |
|---|---|---|
| EP | 2792573 A2 | 10/2014 |
| JP | 2006-240490 A | 9/2006 |
| JP | 2012-106571 A | 6/2012 |
| KR | 101039787 B1 | 6/2011 |

* cited by examiner

FIG. 4

[GROUND INFORMATION]

| DESTINATION TRAIN ID |
|---|
| TRANSMISSION SOURCE GROUND APPARATUS ID |
| COMING-IN ALLOWABLE RANGE |
| ⋮ |
| PLATFORM SCREEN DOOR INFORMATION (PLATFORM SCREEN DOOR OPEN/CLOSED STATE, ...) |
| RESCUE COMMAND INFORMATION (RESCUE TRAIN ID, FAILURE TRAIN ID, FAILURE TRAIN LOCATION, THE NUMBER OF VEHICLES OF FAILURE TRAIN, FAILURE TRAIN COUPLED POSITION, TEMPORARY STOP STATION,⋯) |
| ⋮ |

FIG. 5

[TRAIN INFORMATION]

| DESTINATION GROUND APPARATUS ID |
|---|
| TRANSMISSION SOURCE TRAIN ID |
| TRAIN LENGTH INFORMATION |
| TRAIN LOCATION INFORMATION |
| TRAIN SPEED INFORMATION |
| TRAIN OCCUPANCY RANGE INFORMATION |
| ⋮ |
| VEHICLE DOOR INFORMATION (VEHICLE DOOR OPEN/CLOSED STATE, ..., STOP POSITION DETERMINATION RESULT) |
| RESCUE INFORMATION |
|   FAILURE TRAIN ID |
|   RELATIVE COUPLED POSITION |
|   THE NUMBER OF VEHICLES OF RESCUE TRAIN |
|   THE NUMBER OF VEHICLES OF FAILURE TRAIN |
|   TEMPORARY STOP STATION |
|   TEMPORARY STOP POSITION |
|   ⋮ |
| ⋮ |

ON-BOARD APPARATUS AND GROUND SYSTEM

CROSS REFERENCE TO RELATED APPLICATION

This application is a continuation of International Patent Application No. PCT/JP2016/064108, having an international filing date of May 12, 2016, which designated the United States, the entirety of which is incorporated herein by reference.

BACKGROUND

In railways, in recent years, development of a train control system using radio communication is underway. For example, in a technique of JP-A-2012-106571, while an on-board control apparatus that is an on-board apparatus, broadcasts train side information to a ground side, when a base apparatus that is a ground apparatus, receives the train side information from each train, the base apparatus generates control information for each train and transmits the control information to the train. Then, each train receives the control information for the own train and controls the own train.

Further, in a train control system using radio communication, as a method for managing split and combine (coupling) of trains, a technique of JP-A-2006-240490 is known. According to JP-A-2006-240490, by integrating a train ID of one main train to be coupled and a train ID of the other subordinate train, it is possible to manage the coupled trains as one train.

However, when trains are coupled, because an entire length (train length), or the like, of the train naturally changes, there is a problem that a range where the coupled trains exist on a track cannot be accurately recognized only by the train IDs being integrated. Particularly, in the case where a rescue train rescues a failure train, because there are a case where the failure train is coupled behind the rescue train and the rescue train performs traction traveling, and a case where the failure train is coupled ahead of the rescue train and the rescue train performs propelling traveling, how to judge a range where the coupled trains exist on the track is an issue for an on-board apparatus of the rescue train.

SUMMARY

According to one aspect of the invention, there is provided an on-board apparatus that performs radio communication with a ground system, the ground system being a system that generates traveling control information of each train using train occupancy range information of each train and transmits the traveling control information to the train, the on-board apparatus comprising:

a storage unit that stores base train length information that is train length information of a base train on which the on-board apparatus is mounted;

a calculating unit that calculates train occupancy range information using a traveling location of the base train measured by a traveling location measuring unit and the base train length information;

a communication control unit that controls transmission of the train occupancy range information calculated by the calculating unit to the ground system and reception of the traveling control information from the ground system;

a traveling control unit that controls train traveling on a basis of the received traveling control information; and a coupling detecting unit that detects a relative coupled position of a failure train with respect to the base train and coupling of the failure train while setting the base train as a rescue train, wherein, in a case where detection is performed by the coupling detecting unit, the calculating unit calculates the train occupancy range information by obtaining a head position and a tail position of a series of coupled trains using the traveling location, the base train length information, failure train length information that is train length information of the failure train, and the relative coupled position, and in a case where detection is performed by the coupling detecting unit, the traveling control unit controls traveling of the series of coupled trains.

BRIEF DESCRIPTION OF DRAWINGS

FIG. 4 illustrates a format example of ground information.

FIG. 5 illustrates a format example of train information.

DESCRIPTION OF EXEMPLARY EMBODIMENTS

Figure 1:
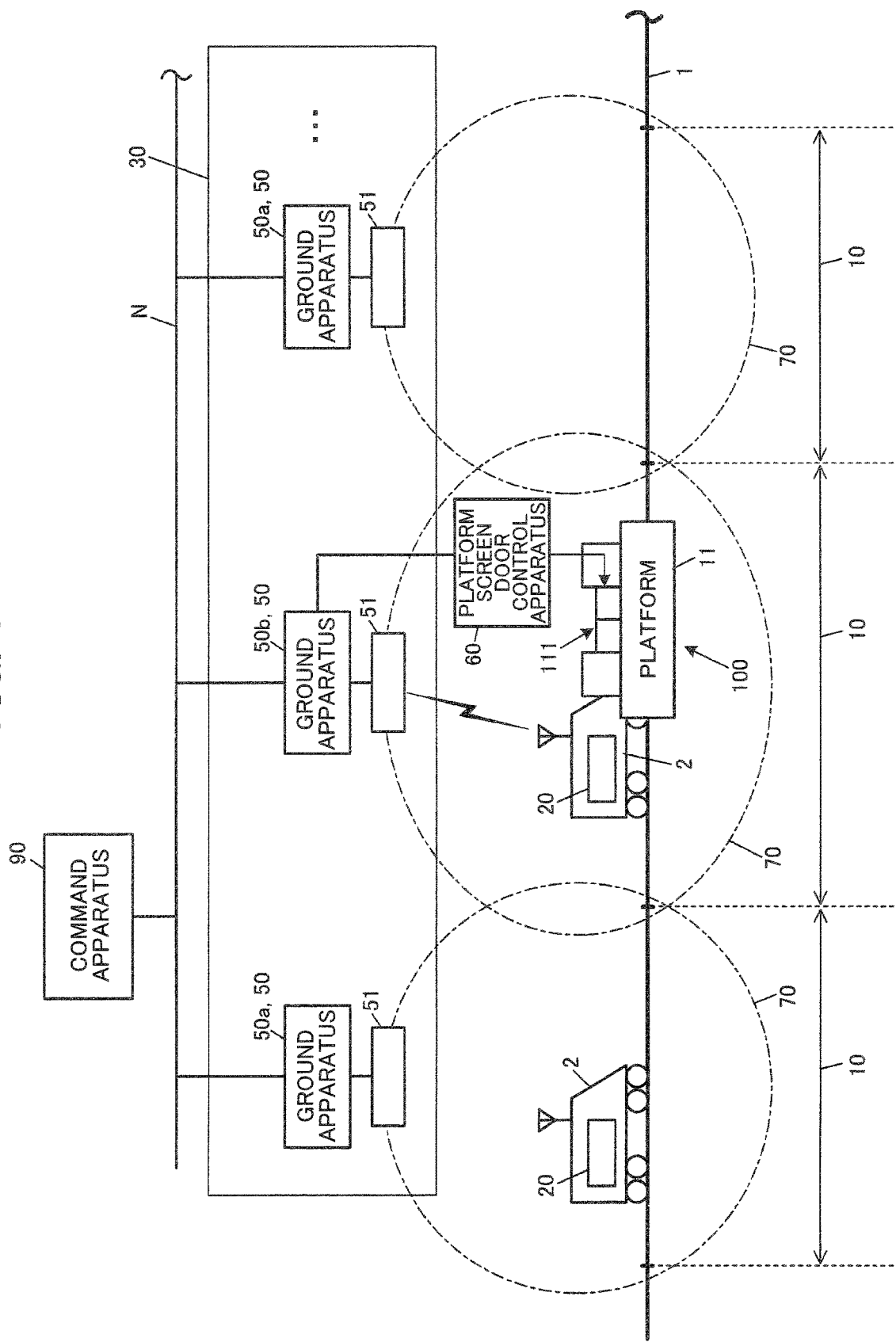
FIG. 1 illustrates an overall configuration example of an on-rail train management system.

By one embodiment of the invention, it is possible to realize safe traveling control of trains by properly recognizing a range where the coupled trains can exist on a track even in the case where another train is coupled to a train, particularly, realize safe traveling control upon rescue by a rescue train.

According to one embodiment of the invention, there is provided an on-board apparatus that performs radio communication with a ground system, the ground system being a system that generates traveling control information of each train using train occupancy range information of each train and transmits the traveling control information to the train, the on-board apparatus comprising:

a storage unit that stores base train length information that is train length information of a base train on which the on-board apparatus is mounted;

a calculating unit that calculates train occupancy range information using a traveling location of the base train measured by a traveling location measuring unit and the base train length information;

a communication control unit that controls transmission of the train occupancy range information calculated by the calculating unit to the ground system and reception of the traveling control information from the ground system;

a traveling control unit that controls train traveling on a basis of the received traveling control information; and a coupling detecting unit that detects a relative coupled position of a failure train with respect to the base train and coupling of the failure train while setting the base train as a rescue train, wherein, in a case where detection is performed by the coupling detecting unit, the calculating unit calculates the train occupancy range information by obtaining a head position and a tail position of a series of coupled trains using the traveling location, the base train length information, failure train length information that is train length information of the failure train, and the relative coupled position, and in a case where detection is performed by the coupling detecting unit, the traveling control unit controls traveling of the series of coupled trains.

By this means, in the case where a failure train is coupled, the on-board apparatus of the base train can calculate the train occupancy range information by obtaining a head position and a tail position of a series of coupled trains using a relative coupled position of the failure train with respect to the base train, train length information, or the like, of the coupled failure train. Then, it is possible to control train traveling in accordance with traveling control information generated by the ground system on the basis of the train occupancy range information of the series of trains. In the case where the base train is coupled to the failure train as a rescue train and travels, in either case of traction traveling and propelling traveling, the on-board apparatus of the base train that is the rescue train can properly recognize a range where the entire coupled trains can exist while regarding the coupled trains as one train, so that it is possible to realize safe traveling control of trains.

Further, in the on-board apparatus, wherein passengers may be on board the failure train, and the traveling control unit includes a temporary stop control unit that, upon control of stopping at a given station at which passengers of the failure train are allowed to get off, (1) calculates a temporary stop position at which the passengers of the failure train can get off at the station using a predetermined station stop position determined at the station and the relative coupled position, and (2) performs control of stopping the train at the temporary stop position.

In the ground system that acquires the train composition information from the on-board apparatus and transmits the traveling control information to the on-board apparatus, the on-board apparatus may include a train composition information setting unit that sets train composition information of a series of coupled trains, including the base train length information, the failure train length information, and the relative coupled position, the ground system may comprise:

a temporary stop position calculating unit that, in order to stop the train at a given station at which passengers who are on board the failure train are allowed to get off, calculates a temporary stop position at which passengers of the failure train can get off at the station using a predetermined station stop position determined at the station and the train composition information; and a transmission control unit that transmits the traveling control information including information of the temporary stop position.

By this means, when the base train stops at a given station after the failure train is coupled to the base train, it is possible to realize control of appropriately stopping the train so that passengers on the failure train that is towed or propelled by the base train can get off at the station.

In the on-board apparatus, wherein, in a case where the relative coupled position at which the failure train is coupled is ahead of the base train, the temporary stop control unit may calculate a position posterior to the station stop position by an amount corresponding to a train length indicated in the failure train length information as the temporary stop position, and, in a case where the relative coupled position at which the failure train is coupled is behind the base train, calculates a position anterior to the station stop position by an amount corresponding to a train length indicated in the base train length information as the temporary stop position.

In the ground system, wherein, in a case where the relative coupled position included in the train composition information is ahead of the base train, the temporary stop position may calculate unit calculates a position posterior to the station stop position by an amount corresponding to a train length indicated in the failure train length information as the temporary stop position, and, in a case where the relative coupled position is behind the base train, calculates a position anterior to the station stop position by an amount corresponding to a train length indicated in the base train length information as the temporary stop position.

By this means, in order to allow the passengers on the failure train to get off at a given station, in the case where the failure train is coupled ahead of the base train, it is possible to stop the base train at a position posterior to a station stop position determined at the station by an amount corresponding to the train length of the failure train. Further, in the case where the failure train is coupled behind the base train, it is possible to stop the base train at a position anterior to the station stop position by an amount corresponding to the train length of the failure train.

In the on-board apparatus, wherein a platform screen door may be provided at the station, the ground system (a) receives vehicle composition information and the temporary stop position from the train, and (b) generates platform screen door opening and closing instruction information and transmits the platform screen door opening and closing instruction information to a control apparatus of the platform screen door upon the stop, the platform screen door opening and closing instruction information being information designating an opening and closing target range of the platform screen door in which the failure train is to be located in a case where the train stops at the temporary stop position, and the on-board apparatus further comprises:

a transmission control unit that performs control of transmitting the failure train length information to the ground system upon the stop.

By this means, when the base train to which the failure train is coupled stops at a station to allow the passengers to get off on a platform, it is possible to open and close a platform screen door only in a range where the failure train is located.

A preferred embodiment of the invention will be described below with reference to the drawings. Note that the invention is not limited to the embodiment described below, and embodiments to which the invention can be applied are not limited to the embodiment described below. Further, in description of the drawings, the same reference numerals will be assigned to the same portions.

FIG. 1 illustrates an overall configuration example of an on-rail train management system in the present embodiment. As illustrated in FIG. 1, the on-rail train management system includes an on-board apparatus 20 mounted on a train (base train) 2 that is traveling on a track 1, a plurality of ground apparatuses 50 (50a, 50b) that perform radio communication with the on-board apparatus 20, a command apparatus 90 that is connected so as to be able to perform communication and transmit and receive data with each of the ground apparatuses 50, and a network N for connecting between the ground apparatuses 50 and between each ground apparatus 50 and the command apparatus 90 so as to be able to perform communication.

In this on-rail train management system, the ground apparatus 50 that is a primary station performs radio communication with a train 2 (actually, the on-board apparatus 20) that is a secondary station in a polling scheme (polling communication). Polling communication is radio communication in which the primary station sequentially makes inquires to all the secondary stations using a list of the secondary stations (polling list), and necessary data (transmission data) is transmitted and received by the secondary stations responding to the inquiries. In the present embodiment, the ground apparatus 50 transmits ground information including a coming-in allowable range, or the like, to the on-board apparatus 20 through polling communication using a train list in which train IDs of the trains 2 to be managed are set as a polling list. Then, in response to polling from the ground apparatus 50, the on-board apparatus 20 returns train information including train location information, train speed information, train occupancy range information, or the like.

The on-board apparatus 20, for example, measures a location (traveling location) and speed (traveling speed) of the own train on the track 1 using rotation speed of an axle based on a detection signal of a speed generator. Then, the on-board apparatus 20 creates a speed check pattern on the basis of the location, or the like, of the own train in accordance with the coming-in allowable range received from the ground apparatus 50, and performs traveling control of the own train. Further, the on-board apparatus 20 performs near field radio communication with a balise every time the train passes through a location near the balise for location correction provided along the track 1 through an antenna provided on the train. Then, the on-board apparatus 20 corrects a location of the own train with a location where the balise is provided (absolute location) determined in advance.

The ground apparatus 50 is disposed for each of control sections 10 obtained by dividing the track 1 at predetermined boundary locations to constitute a ground system 30, manages a train (one train or a plurality of trains) that is on-rail within the control section 10 in which the own apparatus is disposed on the basis of the train location information received from the train 2, and controls railway operation.

Each ground apparatus 50 includes a radio base station 51, and each of the radio base stations 51 is provided at an appropriate location along the track 1 so as not to generate a non-communication zone on the track 1. In the present embodiment, for sake of simplicity of description, each ground apparatus 50 includes one radio base station 51. The radio base station 51 is provided so that a radio communication control region 70 of the radio base station 51 includes the whole area of the control section (hereinafter, referred to as "corresponding control section" as appropriate) 10 in which the ground apparatus 50 is disposed, and the radio communication control regions 70 partially overlap with each other at a boundary portion with the adjacent control section 10.

Note that the radio base station 51 provided at the ground apparatus 50 is not limited to one and may be two or more. It is only necessary that the control section 10 managed by one ground apparatus 50 can be covered by the radio communication control regions 70 of X (X≥1) radio base stations 51 provided at the ground apparatus 50. Further, the radio communication control regions 70 may be formed using loop antennas or leakage coaxial cables (LCX) laid along the track 1 instead of the radio base stations 51 being provided.

Here, the corresponding control section 10 of the ground apparatus 50b includes a station 100 (in more detail, a portion of the track 1 along a platform 11 of the station 100). The ground apparatus 50b is connected so as to be able to perform communication and transmit and receive data with a platform screen door control apparatus 60 that controls opening and closing of a platform screen door 111, and has a door control data relay function of relaying data for door control in addiction to an on-rail detection function that is a function of the ground apparatus 50a. That is, the ground apparatus 50b whose corresponding control section 10 includes the station 100 relays transmission and reception of the data for door control between the platform screen door control apparatus 60 and the train 2 side to open and close a vehicle door of the train 2 in conjunction with the platform screen door 111 when the train 2 arrives at and departs from the corresponding station 100. Note that, while, in the drawings, for the sake of expedience of illustration, there is provided one platform screen door 111, actually, a number of platform screen doors 111 are provided along a longitudinal direction of the platform. Hereinafter, the ground apparatus 50b will be also referred to as a "station ground apparatus 50b" as appropriate.

The command apparatus 90 notifies each ground apparatus 50 of operation command information relating to operation of the train 2 to be managed by the corresponding ground apparatus 50 as needed. As one method, the command apparatus 90 makes a notification of rescue command information in the case where a failure occurs at the train 2 on the track 1. Specifically, if a failure occurs at the train 2, a commander determines a train (rescue train) 2 that is to be directed for rescue on the basis of a location on the track 1, or the like, of the train (failure train) 2 at which the failure has occurred and inputs operation to the command apparatus 90 for giving an instruction to the rescue train 2. In response to this, the command apparatus 90 notifies the ground apparatus 50 relating to the radio communication control region 70 in which the rescue train 2 is located of the rescue command information. While content of the failure is not particularly limited, in the following description, a case will be described where a failure occurs at a driving system of a vehicle, such as a motor, and the train cannot travel by itself. It is assumed that, upon occurrence of a failure, the on-board apparatus 20 mounted on the failure train 2 can perform communication with the ground apparatus 50. Further, it is assumed that the failure occurs during operation, and passengers are on board the failure train 2.

Principle

1. On-Rail Detection of Trains (Polling Communication)

Figure 2:
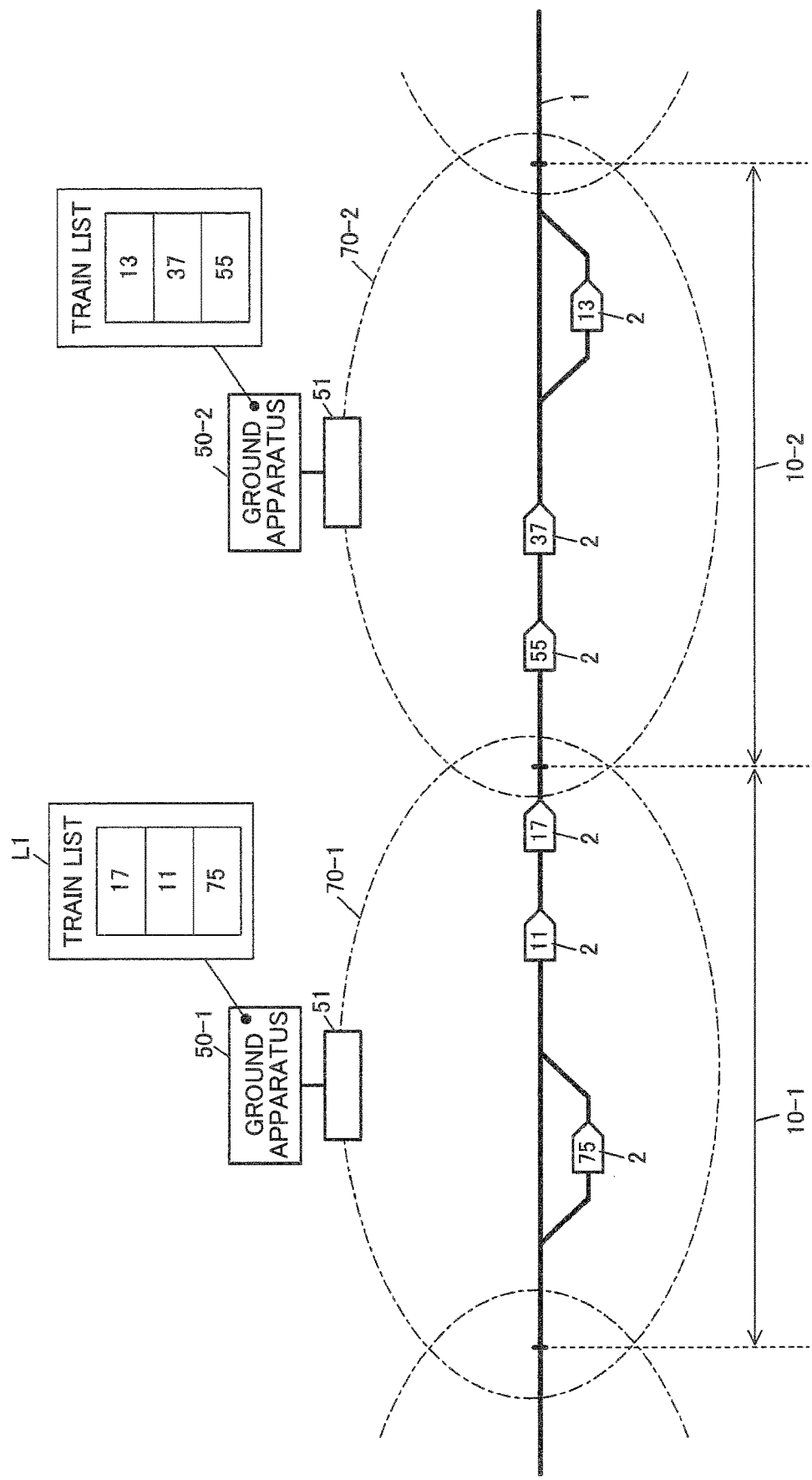
FIG. 2 illustrates an example of an on-rail state of trains in two adjacent control sections.
Figure 3:
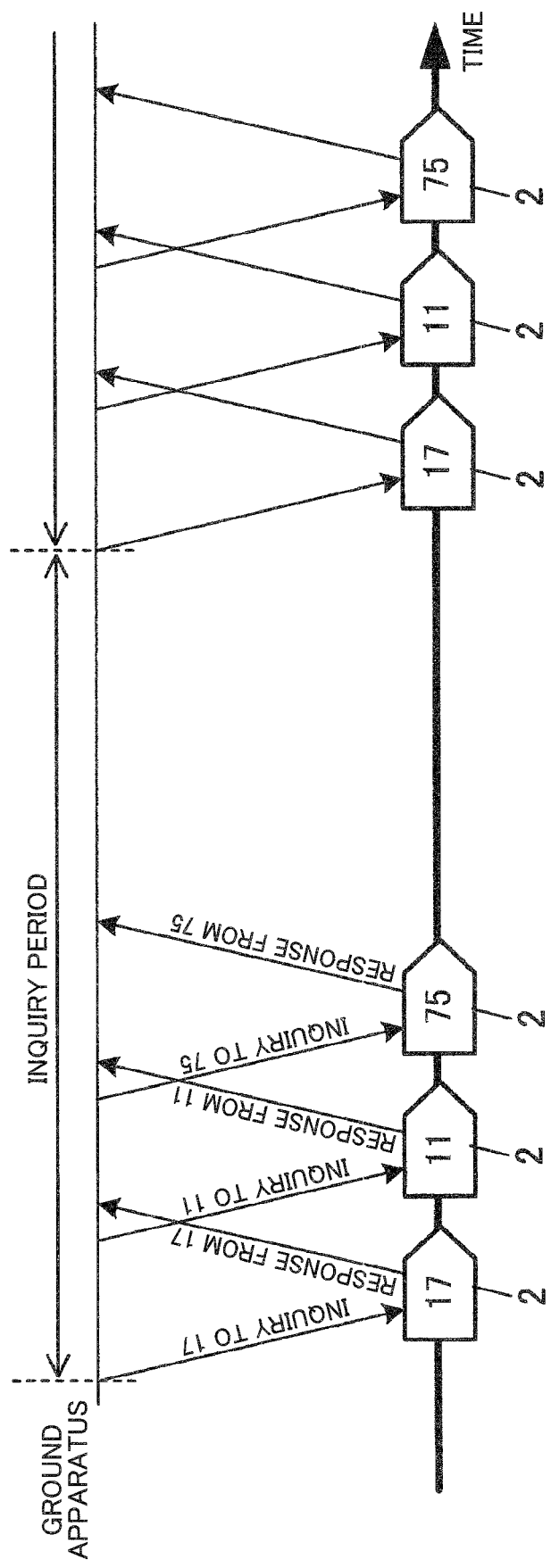
FIG. 3 illustrates a diagram explaining polling communication.

FIG. 2 illustrates an example of an on-rail state of the trains 2 in two adjacent control sections 10 (10-1, 2). Further, FIG. 3 illustrates a diagram explaining polling communication, and illustrates polling communication performed by the ground apparatus 50-1 in the control section 10-1 as a primary station in the on-rail state in FIG. 2.

The ground apparatuses 50 that constitute the ground system 30 respectively hold train lists in which train IDs (train identification information) of the trains 2 to be managed by the own apparatus at the present moment are set. In more detail, each ground apparatus 50 sets trains 2 with which the ground apparatus 50 can perform polling communication, that is, trains 2 existing within the radio communication control region 70 of the ground apparatus 50 as management targets, and, if a train 2 comes in the radio communication control region 70, a train ID of the train 2 is added to the train list, and, if a train 2 goes out from the radio communication control region 70, the train ID is deleted from the train list. For example, in a train list L1 of the ground apparatus 50-1, train IDs of "17", "11", and "75" of three trains 2 within a radio communication control region 70-1 are set.

Then, each ground apparatus 50 periodically performs polling communication with the trains 2 to be managed with a predetermined inquiry period using the train list, and detects on-rail (locations) of the trains 2 in the corresponding control section 10. For example, as illustrated in FIG. 3, the ground apparatus 50-1 makes inquiries by sequentially transmitting ground information respectively addressed to trains 2 having the train IDs of "17", "11", and "75" set in the train list L1 (see FIG. 2). Then, the ground apparatus 50-1 acquires (receives) train information transmitted by the on-board apparatus 20 at the respective trains 2 having the train IDs of "17", "11", and "75" in response to the inquiries. If the train information can be acquired, it is possible to confirm existence of the trains 2 relating to the train information, and recognize locations of the trains 2 using the train location information included in the train information.

The inquiry period is determined in advance on the basis of communication frequency (frequency upon on-rail detection) required for on-rail detection, and may be set as appropriate, for example, for each second, every five seconds, or the like. However, communication frequency (frequency upon relay) higher than the frequency upon on-rail detection is required for transmission and reception of data for door control. For example, the data for door control is transmitted and received at intervals of 50 [ms] to 300 [ms]. Therefore, the station ground apparatus 50b performs polling communication with an inquiry period (period in accordance with the frequency upon relay) shorter than that of the ground apparatus 50a.

1-1. Ground Information

FIG. 4 illustrates a format example of ground information to be transmitted by the ground apparatus 50 upon polling communication. As illustrated in FIG. 4, the ground information includes a destination train ID of the ground information, a transmission source ground apparatus ID of the ground information, a coming-in allowable range, platform screen door information, and rescue command information.

The coming-in allowable range indicates a coming-in allowable range on the track 1 allowed for the train 2, and is calculated by the ground apparatus 50 that is management entity of the train 2, for example, as a distance, or the like, from the location of the train 2. That is, the ground apparatus 50 calculates a coming-in allowable range as needed on the basis of the train occupancy range information, or the like, of the train 2 and the preceding train 2 for each of the trains 2 to be managed, and puts the coming-in allowable range in the ground information to be addressed to the corresponding train 2 upon polling communication.

The platform screen door information is data for door control to be transmitted to the train 2 side by the station ground apparatus 50b. This platform screen door information is set in the ground information generated by the station ground apparatus 50b, and the platform screen door information is set blank (empty) in the ground information generated by the ground apparatus 50a.

In the rescue command information, the rescue command information notified from the command apparatus 90 is set. This rescue command information includes a rescue train ID, a failure train ID, a failure train location, the number of vehicles of the failure train, a failure train coupled position, a temporary stop station, or the like. When the ground apparatus 50 receives a notification of the rescue command information from the command apparatus 90, the ground apparatus 50 puts the rescue command information in the ground information addressed to the train 2 having the rescue train ID. If there is no notification of the rescue command information, the rescue command information is set blank (empty).

1-2. Train Information

FIG. 5 illustrates a format example of the train information to be replied by the on-board apparatus 20 in response to polling from the ground apparatus 50. As illustrated in FIG. 5, the train information includes a destination ground apparatus ID of the train information, a transmission source train ID of the train information, train length information, train location information, train speed information, train occupancy range information, vehicle door information, and rescue information.

The train length information indicates a train length (entire length) of the own train, and is set as composition information of vehicles constituting the train 2. While an actual length may be set, in the present embodiment, the train length is determined in accordance with the number of vehicles of the train 2, and upon normal operation, the number of vehicles 223 (see FIG. 11) held by the on-board apparatus 20 is set in the train length information. However, in the case where the failure train 2 is coupled to the own train that is set as the rescue train 2, the train length information is calculated as the number of vehicles assuming the whole coupled trains as one train, that is, the number of vehicles obtained by adding the number of vehicles of the failure train 2 to the number of vehicles 223.

The train location information indicates a traveling location of the own train on the track 1, and the train speed information indicates traveling speed of the own train. Note that, while, in the present embodiment, for example, a head position is set as the traveling location of the own train, a rear end position (tail position) may be set as the traveling location. Because a relative distance between a location where the speed generator is provided and the front end position and the rear end position of the own train is fixed, it is possible to obtain the train location information and the train speed information from the location measured by the speed generator and the relative distance in either case where the head position is set as the traveling location and where the rear end position is set as the traveling location.

The train occupancy range information is calculated as a range in which a buffer distance is added to the head position and the rear end position of the own train in anticipation of a measurement error of a location measured using the speed generator. Specifically, in the train occupancy range information, a position anterior to the head position ahead in the traveling direction by a head buffer distance, and a position posterior to the rear end position behind in the traveling direction by a rear end buffer distance are set. The head buffer distance and the rear end buffer distance are determined in advance.

The vehicle door information is data for door control to be transmitted to the station ground apparatus 50*b* by the train 2. The vehicle door information is set in the case where the ground apparatus 50 having the destination ground apparatus ID is the station ground apparatus 50*b*, and is set blank (empty) in the case where the ground apparatus 50 having the destination ground apparatus ID is the ground apparatus 50*a*.

The rescue information includes a failure train ID, a relative coupled position, the number of vehicles of the rescue train, the number of vehicles of the failure train, the temporary stop station, and the temporary stop position. This rescue information is set in the case where the own train travels as the rescue train 2 and is coupled to the failure train 2.

Note that, in the ground information and the train information, in addition to the illustrated data, for example, necessary data such as transmission time and a CRC (Cyclic Redundancy Checking) code for error detection is set as appropriate. Data to be included in the ground information and the train information as transmission data is also set as appropriate. For example, in the ground information, traveling control information, or the like, that is necessary for the train 2 to control traveling of the own train is included as appropriate, in addition to the coming-in allowable range, and, in the train information, the traveling information, or the like, that should be acquired by the ground apparatus 50 from the train 2 to generate the traveling control information is included as appropriate. Further, in the ground information, operation command information, or the like, notified from the command apparatus 90 with respect to the train 2 relating to the ground information is included as appropriate.

2. Relay of Data for Door Control

The station ground apparatus 50*b* constitutes a door opening and closing system with the train 2 that arrives at the station 100 within the corresponding control section 10 and comes in the platform 11, the platform screen door control apparatus 60, or the like. Conjunctive opening and closing control of the platform screen door 111 and the vehicle door in accordance with arrival and departure of the train 2 to and from the station 100 is realized with this door opening and closing system. Here, the platform screen door 111 is positioned so as to face the vehicle door of the train 2 when the train 2 that comes in the platform 11 stops at a station stop position determined in advance, and is provided on the platform 11.

In this door opening and closing system, it is determined whether or not the train 2 that arrives at the station 100 stops at the station stop position. In the present embodiment, because the traveling location and the traveling speed of the own train are measured at the on-board apparatus 20, it is possible to specify that the own train stops and the stop position on the basis of the traveling location and the traveling speed. Stop position determination is performed by, for example, the on-board apparatus 20. That is, the on-board apparatus 20 determines whether or not the train 2 stops at the station stop position on the basis of the measured traveling location and traveling speed of the own train.

However, when the rescue train 2 arrives at the station, determination whether or not the rescue train 2 stops at the temporary stop position is performed as stop position determination. Note that the stop position determination may be performed by the station ground apparatus 50*b* on the basis of the train location information and the train speed information acquired as needed from the train 2 through polling communication.

Further, the stop position determination may be performed only using the train location information. For example, in the case where a state where a difference (position gap) between a current value of the traveling location and a previous value of the traveling location measured at the last minute is within a predetermined position gap allowable distance (for example, from 10 to 50 cm or may be zero) continues for predetermined seconds (for example, from 1 to 3 seconds), it is judged that the train stops, or in the case where a state where a gap between the current value and the station stop position or the temporary stop position is within an allowable range (for example, a distance approximately from 10 to 50 cm) continues for predetermined seconds (for example, from 1 to 3 seconds), it is judged that the train is located at the station stop position, or the like, and it is ultimately determined that the train stops at the station stop position, or the like.

If it can be determined that the train 2 stops at the station stop position or the temporary stop position through this stop position determination, the platform screen door control apparatus 60 causes the platform screen door 111 to perform opening operation. This opening operation of the platform screen door 111 may be automatically started in response to determination that the train 2 stops at the station stop position, or the like, or may be started after operation input of a staff is accepted. Thereafter, for example, the vehicle door control apparatus 28 (see FIG. 11) causes the vehicle door to perform opening operation in response to determination that the platform screen door 111 is completely open. Meanwhile, when getting-on and getting-off of passengers are finished, the vehicle door control apparatus 28 causes the vehicle door to perform closing operation. This closing operation of the vehicle door may be automatically started at departure time at which the train 2 departs from the station 100, or may be started after operation input from the staff is accepted. Then, for example, when the vehicle door is completely closed, the platform screen door control apparatus 60 causes the platform screen door 111 to perform closing operation.

In this manner, in order to open and close the platform screen door 111 and the vehicle door in conjunction with each other, on the train 2 side, for example, it is necessary to acquire an open/closed state of the platform screen door 111, and an opening door instruction, or the like, of the vehicle door in association with opening of the platform screen door 111 from the platform screen door control apparatus 60, and at the platform screen door control apparatus 60, it is necessary to acquire, for example, an open/closed state of the vehicle door, and a closing door instruction, or the like, of the platform screen door 111 in association with closing of the vehicle door from the train 2 side. Further, the platform screen door control apparatus 60 needs to know whether the train 2 stops at the station stop position or the temporary stop position to start opening operation of the platform screen door 111.

The door control data relay function is a function for relaying necessary data for door control between the platform screen door control apparatus 60 and the train 2 side, and utilizes polling communication performed in the on-rail detection function. That is, the station ground apparatus 50*b* sets platform screen door information that is the data for door control addressed to the train 2 side upon polling communication in the ground information. Here, the platform screen door information includes, in addition to the open/closed state of the platform screen door 111 and the opening door instruction of the vehicle door, data that should be acquired by the vehicle door control apparatus 28 from the platform screen door control apparatus 60 for the above-described conjunctive opening and closing control, such as a target train ID and arrival and departure track number information. For example, the platform screen door control apparatus 60 transmits the platform screen door information to the station ground apparatus 50*b* at frequency equal to frequency upon relay, and the station ground apparatus 50*b* transmits the platform screen door information from the platform screen door control apparatus 60 to the on-board apparatus 20 by putting the platform screen door information in the ground information addressed to the corresponding train 2. Then, at the on-board apparatus 20, the platform screen door information received through polling communication is transferred to the vehicle door control apparatus 28 as needed.

Meanwhile, the on-board apparatus 20 sets vehicle door information that is data for door control addressed to the station ground apparatus 50*b* in the train information in response to polling from the station ground apparatus 50*b*. The vehicle door information includes, in addition to the open/closed state of the vehicle door and the closing door instruction of the platform screen door 111, data that should be acquired from the vehicle door control apparatus 28 necessary for the platform screen door control apparatus 60 to perform opening and closing control of the platform screen door 111, such as the arrival and departure track number information, and a result of the stop position determination. For example, the vehicle door control apparatus 28 transmits the vehicle door information to the on-board apparatus 20 at frequency equal to the frequency upon relay, and the on-board apparatus 20 sets the vehicle door information including the result of the stop position determination in the train information, and transmits the train information to the station ground apparatus 50*b*. Then, the station ground apparatus 50*b* transfers the vehicle door information received through polling communication to the platform screen door control apparatus 60 as needed.

3. Operation of Rescue Train

Figure 6:
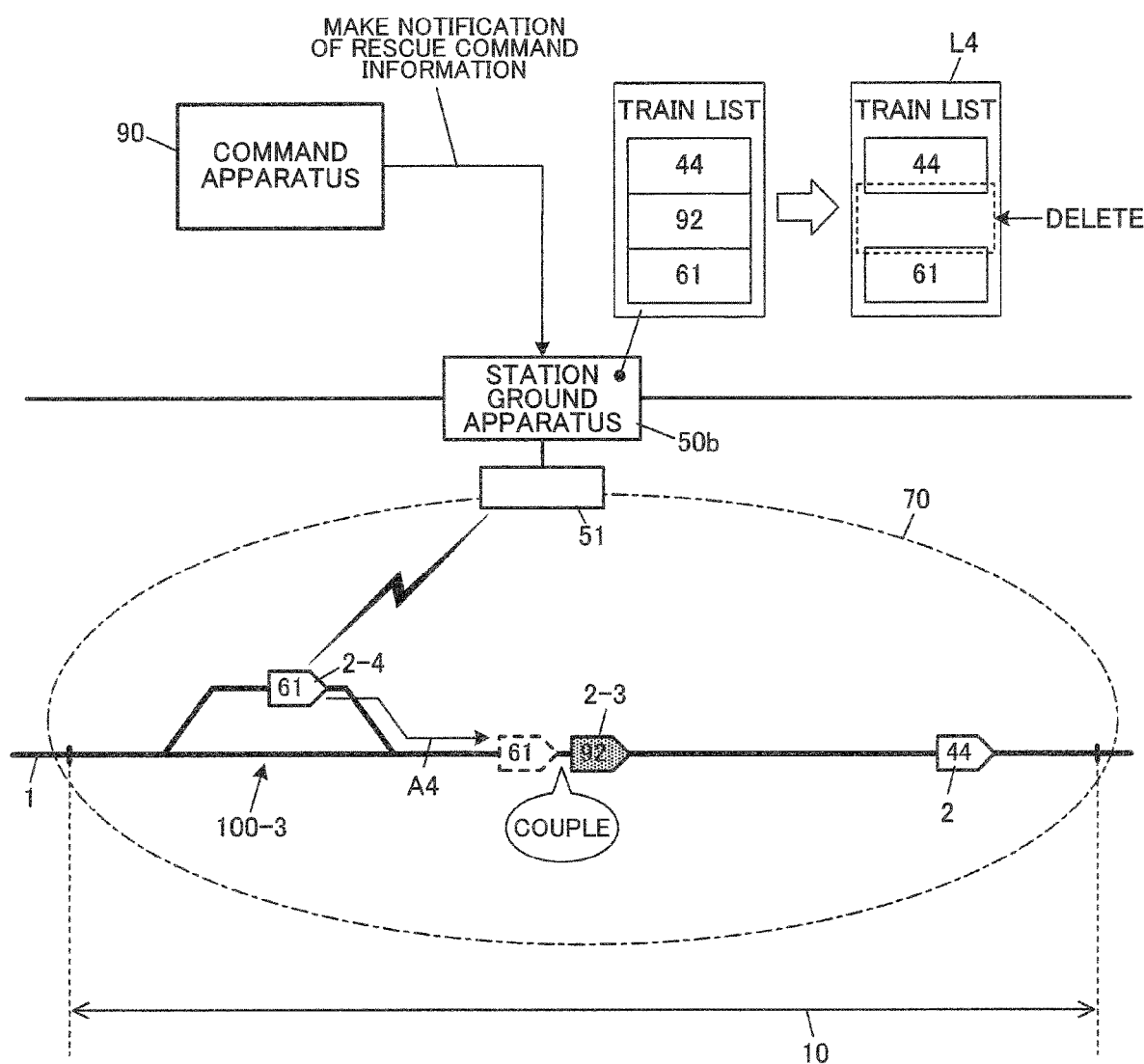
FIG. 6 illustrates a diagram explaining operation of a rescue train.

In the case where some kind of failure such as a vehicle failure occurs at the train 2 and, as a result, the train 2 cannot travel by itself, or the like, it is necessary to take a measure such as moving the train 2 to a rail yard after allowing passengers to get off at a predetermined station 100. FIG. 6 illustrates a diagram explaining operation of the rescue train 2 for the measure. In FIG. 6, a left direction is set as upbound (origination of the track 1) and a right direction is set as downbound.

If a failure occurs at the train 2 that travels on the track 1, first, the command apparatus 90 determines the rescue train 2. Specifically, a train 2 that is close to the failure train 2 and on which passengers are not on-board, such as a train 2 that is held at the station 100 closest to the train 2 at which a failure has occurred (failure train 2) or is held at a rail yard is set as the rescue train. For example, it is assumed that a failure has occurred at a train 2-3 having a train ID of "92" that is hatched in FIG. 6, and a train 2-4 having a train ID of "61" that stops at a station 100-3 is selected as the rescue train.

If the rescue train 2-4 is determined, the command apparatus 90 notifies the ground apparatus 50 (in FIG. 6, the station ground apparatus 50*b*) that is the management entity of rescue command information in which a rescue train ID (here, a train ID of the rescue train 2-4), a failure train ID (here, a train ID of the failure train 2-3), a failure train location, the number of vehicles of the failure train, a failure train coupled position, a temporary stop station, or the like, are set.

The failure train location indicates a location of the failure train 2 on the track 1, and the number of vehicles of the failure train indicates the number of vehicles of the failure train 2. While the failure train location indicates a current location of the failure train 2, in the case where a location is indefinite, it is also possible to use a value in which the coming-in allowable range is taken into account in the train location information in the train information received from the failure train 2 last time (that is, immediately before the failure has occurred) at the ground apparatus 50 that manages the failure train 2. In a similar manner, as the number of vehicles of the failure train, it is also possible to use the train length information in the train information received from the failure train 2. The command apparatus 90 acquires these from the corresponding ground apparatus 50 and sets these in the rescue command information.

The failure train coupled position indicates a relative coupled position of the failure train 2 with respect to the rescue train 2, and can be determined from positional relationship between the rescue train 2 and the failure train 2. For example, in the case where the rescue train 2 is located upbound of the failure train 2, the rescue train 2 approaches the failure train 2 from upbound, and an upbound end vehicle of the failure train 2 is coupled to a downbound end vehicle of the rescue train 2, in which case the failure train coupled position is regarded as "downbound". Inversely, in the case where the rescue train 2 is located downbound of the failure train 2, the rescue train 2 approaches the failure train 2 from downbound, and a downbound end vehicle of the failure train 2 is coupled to an upbound end vehicle of the rescue train 2, in which case, the failure train coupled position is regarded as "upbound". FIG. 6 illustrates an example of the former case, and "downbound" is set as the failure train coupled position.

The temporary stop station is a given station 100 at which the rescue train 2 stops after the failure train 2 is coupled to the rescue train 2, and the rescue train 2 stops at the temporary stop station to allow the passengers of the failure train 2 to get off. For example, in the case where the temporary stop station is a station 100-3 in the example in FIG. 6, the rescue train 2-4 returns to the station 100-3 and allows the passenger of the failure train 2 to get off after the failure train 2-3 is coupled to the rescue train 2.

The ground apparatus 50 that is notified of the rescue command information calculates a coming-in allowable range, or the like, in accordance with the rescue command information to generate traveling control information. Then, the ground apparatus 50 sets the generated traveling control information in the ground information addressed to the rescue train 2 along with the rescue command information, and transmits the ground information to the rescue train 2. Meanwhile, the on-board apparatus 20 of the rescue train 2-4 controls traveling and stop of the own train on the basis of the received traveling control information such as the coming-in allowable range. By this means, operation of the rescue train 2 relating to rescue of the failure train 2 is realized.

For example, in a case of FIG. 6, the rescue train 2-4 first travels to the location of the failure train 2 (arrow A4). Then, when the rescue train 2-4 moves to the location of the failure train 2, work for coupling the failure train 2-3 to the rescue train 2-4 is performed. During this work, the on-board apparatus 20 of the rescue train 2-4 is put into a standby state until coupling of a vehicle with respect to the upbound end vehicle or the downbound end vehicle is detected.

Figure 7:
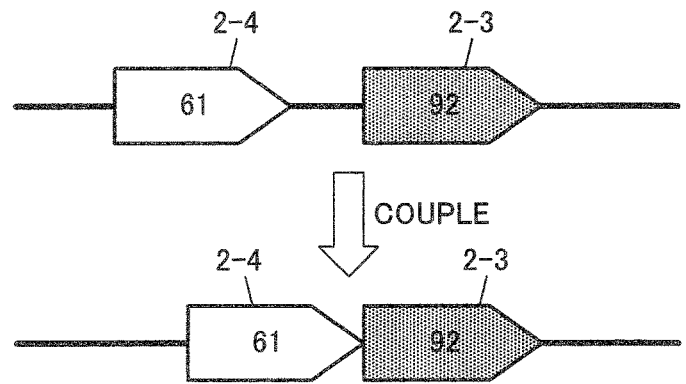
FIG. 7 illustrates a diagram explaining coupling of the rescue train and a failure train.

FIG. 7 illustrates a diagram explaining coupling of the rescue train 2-4 and the failure train 2-3. In the present example, because the failure train coupled position is "downbound", the upbound end vehicle of the failure train 2-3 is coupled to the downbound end vehicle of the rescue train 2-4 with couplers 29 (see FIG. 11) of the both vehicles.

When coupling between the vehicles via the couplers 29 is completed, a coupling signal is output from the coupler 29 to the on-board apparatus 20. The on-board apparatus 20 of the rescue train 2 detects coupling of the failure train 2 and a relative coupled position from input of this coupling signal. Specifically, in the case where a coupling signal is input from the coupler 29 of the downbound end vehicle, the on-board apparatus 20 detects that the failure train 2 is coupled "downbound", and in the case where a coupling signal is input from the coupler 29 of the upbound end vehicle, the on-board apparatus 20 detects that the failure train 2 is coupled "upbound". FIG. 7 illustrates the former case. The failure train coupled position detected here should match the failure train coupled position in the rescue command information if coupling is performed in accordance with the rescue command information.

If coupling of the failure train 2-3 and the relative coupled position are detected, the on-board apparatus 20 of the rescue train 2-4 calculates the train length information of a series of coupled trains on the basis of the number of vehicles of the coupled failure train 2-3. The train length information can be obtained as the number of vehicles that is obtained by adding the acquired number of vehicles of the failure train 2-3 to the number of vehicles 223 of the rescue train 2-4 that is the own train. As the number of vehicles of the failure train 2-3, the number of vehicles of the failure train included in the rescue command information is used.

This train length information is used for calculation of the train occupancy range information to be included in the ground information in polling communication thereafter. When the train occupancy range information is calculated, first, it is determined whether the failure train 2 is coupled ahead in the traveling direction or coupled behind in the traveling direction from the traveling direction of the rescue train 2-4 and the detected relative coupled position. Then, in the case where the failure train 2 is coupled ahead in the traveling direction, a position anterior to the traveling location that is the head position of the rescue train 2-4 by a length corresponding to the number of vehicles of the failure train 2-3 is obtained as the head position of the series of coupled trains, and the train occupancy range information is calculated by adding the head buffer distance to the obtained head position of the series of trains and adding the rear end buffer distance to the rear end position of the rescue train 2-4. Meanwhile, in the case where the failure train 2 is coupled behind in the traveling direction, a position posterior to the rear end position of the rescue train 2-4 by a length corresponding to the number of vehicles of the failure train 2-3 is obtained as the rear end position of the series of coupled trains, and the train occupancy range information is calculated by adding the head buffer distance to the head position (traveling location) and adding the rear end buffer distance to the obtained rear end position of the series of trains. In actual processing, in the former case, the train occupancy range information can be obtained by adding a buffer distance to a range corresponding to the number of vehicles (train length information) of the series of trains in which the rear end position obtained from the traveling location is set as termination. In the latter case, the train occupancy range information can be calculated by adding a buffer distance to a range corresponding to the number of vehicles of the series of trains in which the head position that is the traveling location is set as beginning.

Figure 8:
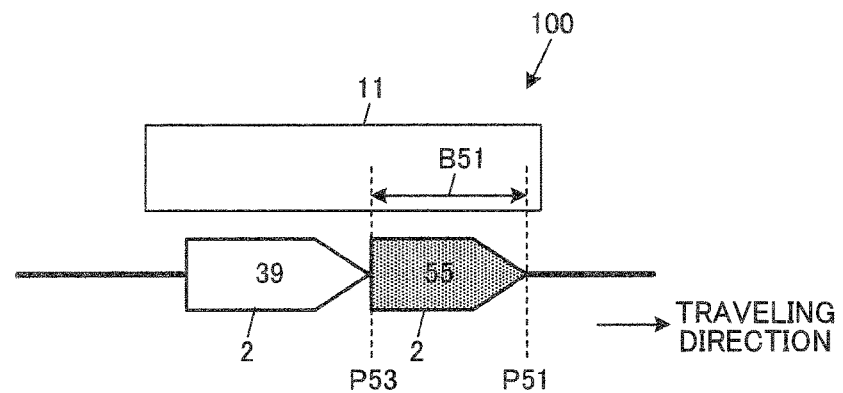
FIG. 8 illustrates a diagram explaining calculation of a temporary stop position.
Figure 9:
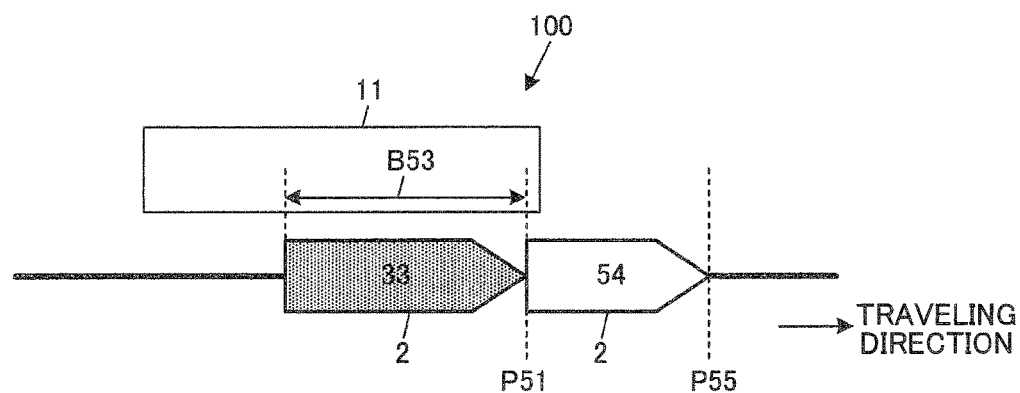
FIG. 9 illustrates a diagram explaining calculation of the temporary stop position.

Further, the temporary stop position of the rescue train 2-4 at the temporary stop station is calculated. FIG. 8 and FIG. 9 illustrate diagrams explaining calculation of the temporary stop position. FIG. 8 illustrates the temporary stop position P53 in the case where the failure train 2 having the train ID of "55" is coupled ahead of the rescue train 2 having the train ID of "39" in the traveling direction (in a case of propelling traveling), and FIG. 9 illustrates the temporary stop position P55 in the case where the failure train 2 having the train ID of "33" is coupled behind the rescue train 2 having the train ID of "54" in the traveling direction (in a case of traction traveling).

Because the rescue train 2 stops at the temporary stop station to allow the passengers to get off from the failure train 2, the rescue train 2 needs to stop at a position where the vehicle door of the failure train 2 faces the platform screen door 111 of the station 100 upon the stop. Meanwhile, a station stop position (station stop position P51 in FIG. 8 and FIG. 9) is determined in advance at each station 100 on the track 1.

Therefore, as illustrated in FIG. 8, in a case of propelling traveling in which the failure train 2 having the train ID of "55" is coupled ahead of the rescue train 2 in the traveling direction toward the temporary stop station, the on-board apparatus 20 of the rescue train 2 having the train ID of "39" calculates a position P53 posterior to the station stop position P51 of the station 100 in the traveling direction by an amount corresponding to a train length of the failure train 2 having the train ID of "55" as the temporary stop position. Meanwhile, as illustrated in FIG. 9, in a case of traction traveling in which the failure train 2 having the train ID of "33" is coupled behind the rescue train 2 in the traveling direction, the on-board apparatus 20 of the rescue train 2 having the train ID of "54" calculates a position P55 anterior to the station stop position P51 in the traveling direction by an amount of a train length of the own train as the temporary stop position. By this means, in either case, the rescue train 2 can stop in a state where the failure train 2 stops at the station stop position P51 of the station 100.

Returning to FIG. 6, if the on-board apparatus 20 of the rescue train 2-4 acquires the train ID and the number of vehicles of the failure train 2-3, train length information of a series of coupled trains, and the temporary stop position of the rescue train 2-4 at the temporary stop station, the on-board apparatus 20 transmits ground information including these information to the ground apparatus 50 (the station ground apparatus 50b in FIG. 6). The ground apparatus 50 that receives this ground information generates traveling control information. When the on-board apparatus 20 receives the generated traveling control information from the ground apparatus 50, the on-board apparatus 20 then controls traveling and stop of the own train in accordance with the received traveling control information. The own train at this time is a series of trains in which the failure train 2-3 is coupled to the rescue train 2-4. By this means, the rescue train 2-4 travels to the temporary stop station while towing or propelling the failure train 2-3 and stops at the temporary stop position. Note that, in operation of the rescue train 2-4, the on-board apparatus 20 of the rescue train 2-4 performs polling communication as a representative, and the on-board apparatus 20 of the failure train 2 does not perform polling communication with the ground apparatus 50. To realize this, the ground apparatus 50 (the station ground apparatus 50*b* in FIG. 6) excludes the failure train 2-3 from targets of polling communication using the train list L4 from which the train ID of "92" of the failure train 2 is deleted.

By the way, because the rescue train 2 stops at the temporary stop station to allow the passengers of the failure train 2 to get off, it would be better off setting only the platform screen door 111 within a range of the failure train 2 as a target of opening and closing of the platform screen door 111 upon the stop, because other platform screen door 111 is irrelevant to getting-on and getting-off of passengers.

Therefore, the on-board apparatus 20 transmits the rescue information within the train information including the number of vehicles of the failure train 2 (the number of vehicles of the failure train) (see FIG. 5) to the ground apparatus 50. Meanwhile, the ground apparatus 50 that receives this rescue information, to be exact, the station ground apparatus 50*b* whose corresponding control section 10 includes the temporary stop station, generates platform screen door opening and closing instruction information designating an opening and closing target range of the platform screen door 111 using the number of vehicles of the failure train, and transmits the platform screen door opening and closing instruction information to the platform screen door control apparatus 60. For example, in the example in FIG. 8, a range B51 corresponding to the train length of the failure train 2 having the train ID of "55" from the station stop position P51 at the platform 11 is set as the opening and closing target range. Alternatively, in the example illustrated in FIG. 9, a range B53 corresponding to the train length of the failure train 2 having the train ID of "33" from the station stop position P51 is set as the opening and closing target range. Then, in the case where the rescue train 2 stops at the temporary stop position, the platform screen door control apparatus 60 controls opening and closing of the platform screen door 111 in the opening and closing target range designated in the platform screen door opening and closing instruction information. By the temporary stop position being obtained as described above, and opening and closing control being performed only on the platform screen door 111 in the opening and closing target range, it is possible to allow the passengers of the failure train 2 to reliably and safely get off at the temporary stop station.

Functional Configuration

1. Ground Apparatus

Figure 10:
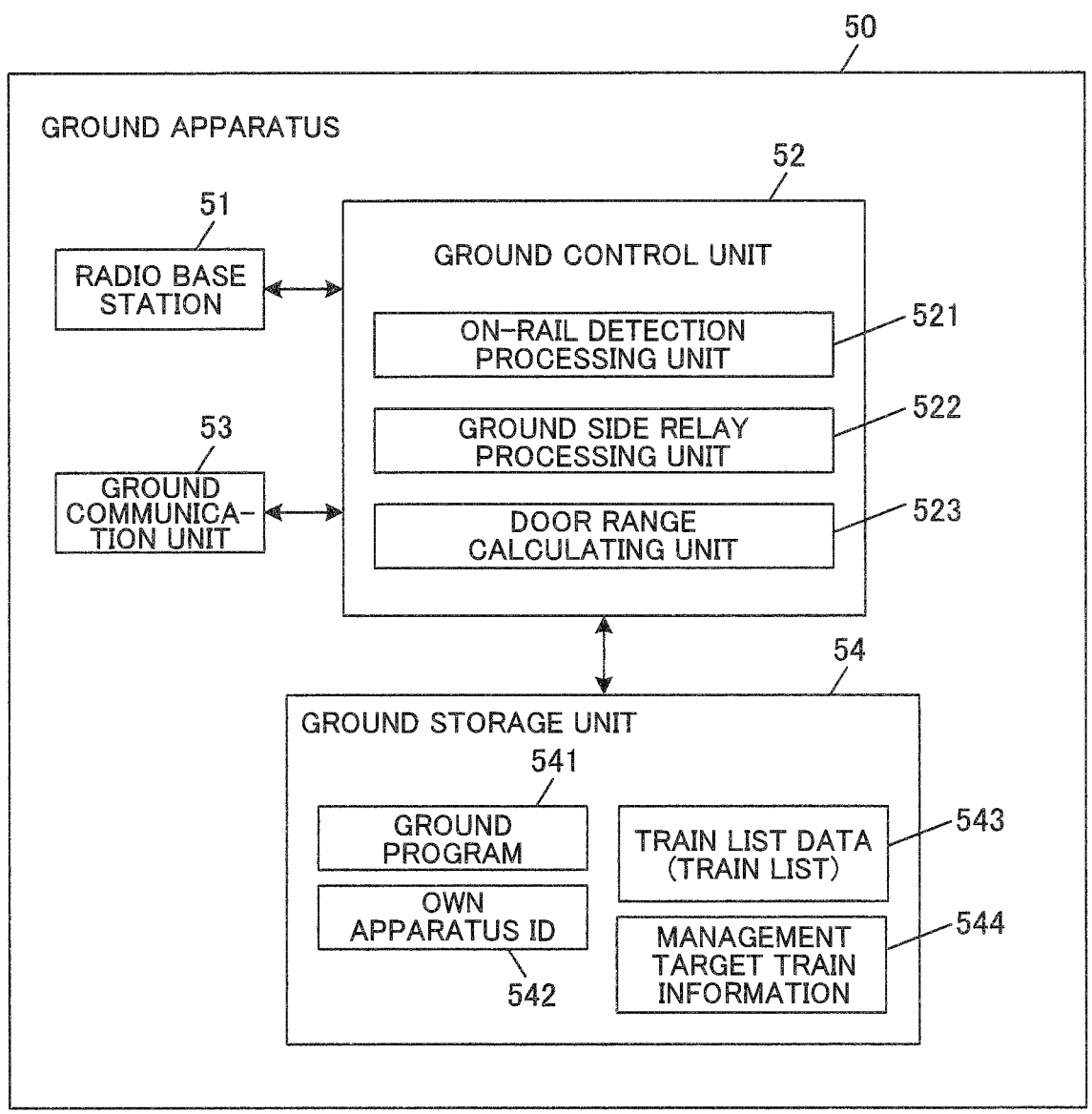
FIG. 10 illustrates a block diagram of a functional configuration example of a ground apparatus.

FIG. 10 illustrates a block diagram of a functional configuration example of the ground apparatus 50. As illustrated in FIG. 10, the ground apparatus 50 is one type of a computer control apparatus including a radio base station 51 provided at an appropriate position close to the track 1, a ground control unit 52, a ground communication unit 53, and a ground storage unit 54.

The ground control unit 52 is configured to include an arithmetic apparatus and an arithmetic circuit such as, for example, a CPU (Central Processing Unit) and an FPGA (Field Programmable Gate Array), and comprehensively controls operation of the ground apparatus 50 by issuing an instruction and transferring data to respective components constituting the ground apparatus 50 on the basis of programs and data stored in the ground storage unit 54, and data, or the like, received from the on-board apparatus 20 (train 2), other ground apparatuses 50, and the command apparatus 90. The ground control unit 52 includes an on-rail detection processing unit 521, a ground side relay processing unit 522, and a door range calculating unit 523. Each functional unit provided at the ground control unit 52 may be implemented with individual arithmetic circuits, or may be individually implemented by one arithmetic circuit through software arithmetic processing.

The on-rail detection processing unit 521 performs polling communication with the trains 2 to be managed with a predetermined inquiry period using the train list 543 to detect on-rail of the trains 2 in the corresponding control section 10.

The ground side relay processing unit 522 is a functional unit that performs processing in the case where the ground apparatus 50 is the station ground apparatus 50*b*. The ground apparatus 50*a* does not have to include the ground side relay processing unit 522 or may be put into a state where the ground side relay processing unit 522 is not allowed to function. The ground side relay processing unit 522 transfers the vehicle door information received from the train 2 through polling communication to the platform screen door control apparatus 60 along with the transmission source train ID in each case.

In the case where the train 2 to be managed operates as a rescue train, and in the case where rescue information is received from the rescue train 2, the door range calculating unit 523 specifies the opening and closing target range of the platform screen door 111 using the number of vehicles of the failure train, and transmits the opening and closing target range to the platform screen door control apparatus 60 as platform screen door opening and closing instruction information.

The ground communication unit 53 is a wired or wireless communication apparatus that is implemented with, for example, a wireless communication module, a router, a modem, a TA, a jack of a wired communication cable, a control circuit, or the like, and performs communication with external apparatuses (in the present embodiment, other ground apparatuses 50 and the command apparatus 90).

The ground storage unit 54 is implemented with a storage medium such as an IC memory, a hard disk and an optical disk. In the ground storage unit 54, programs for causing the ground apparatus 50 to operate and realizing various functions provided at the ground apparatus 50, and data, or the like, to be used during execution of the programs, are stored. In the present embodiment, in the ground storage unit 54, a ground program 541, an own apparatus ID 542, train list data (train list) 543, and management target train information 544 are stored.

The ground control unit 52 realizes functions of the on-rail detection processing unit 521, the ground side relay processing unit 522, the door range calculating unit 523, or the like, by reading out and executing the ground program 541 from the ground storage unit 54. In the own apparatus ID 542, a ground apparatus ID of the own apparatus is set. In the train list 543, train IDs of the trains 2 to be managed are set.

The management target train information 544 stores locations, speed, or the like, of the trains 2 to be managed, that are recognized as a result of polling communication. For example, the management target train information 544 is prepared for each of train IDs of the trains 2 to be managed, and is set as reception history of train length information, train location information, train speed information, train occupancy range information, or the like, included in the train information received from the corresponding train 2 until the previous polling communication. In the case where the vehicle door information and the rescue information are received, the vehicle door information and the rescue information are included and stored in the reception history.

2. On-Board Apparatus

Figure 11:
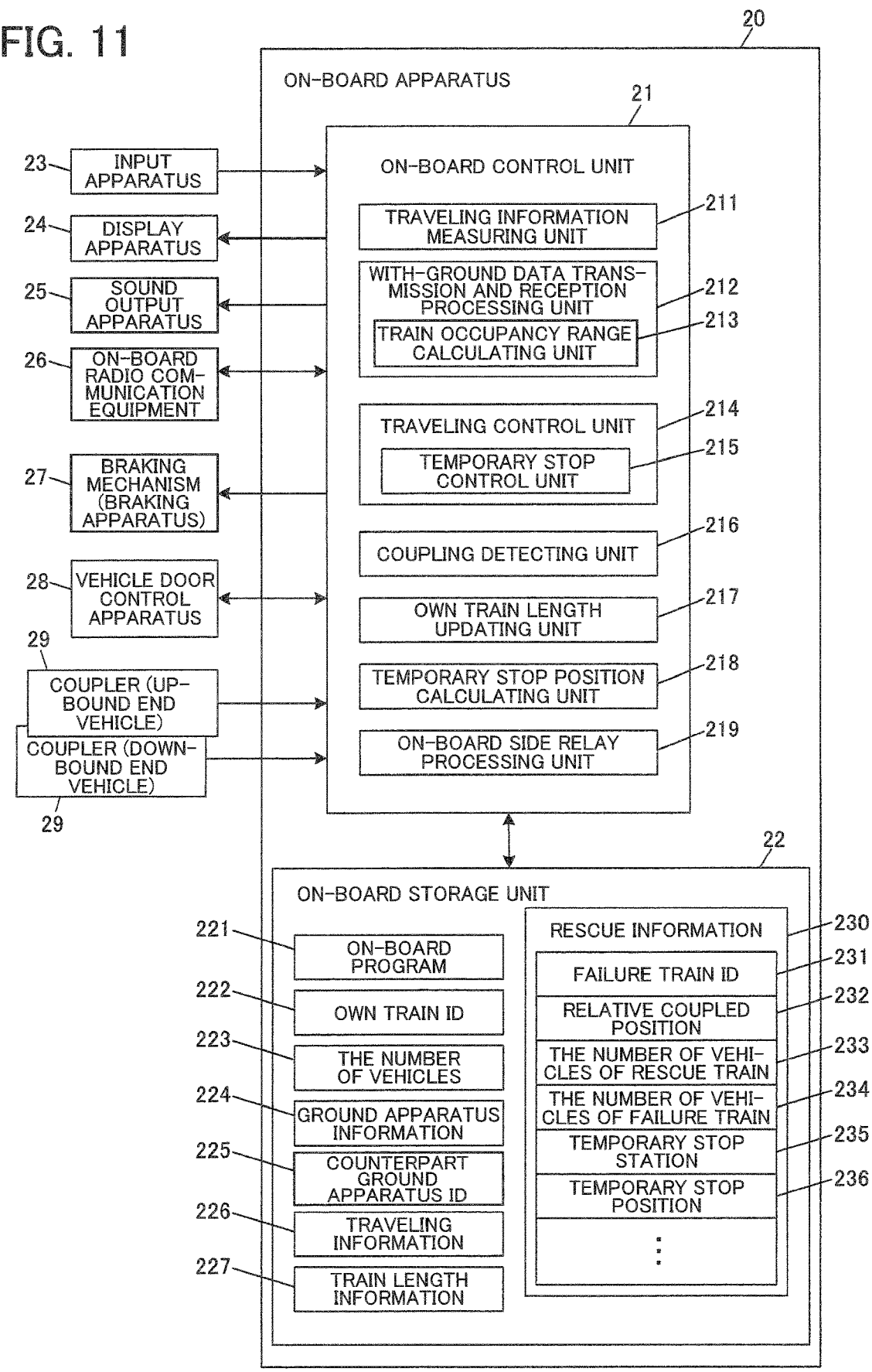
FIG. 11 illustrates a block diagram of a functional configuration example of an on-board apparatus.

FIG. 11 illustrates a block diagram of a functional configuration example of the on-board apparatus 20. As illustrated in FIG. 11, the on-board apparatus 20 that is one type of a computer control apparatus configured to include an on-board control unit 21 and an on-board storage unit 22, is connected to an input apparatus 23, a display apparatus 24, a sound output apparatus 25, on-board radio communication equipment 26, a braking mechanism (braking apparatus) 27, a vehicle door control apparatus 28, couplers 29 of respective vehicles constituting the own train, or the like.

The on-board control unit 21 is configured to include an arithmetic apparatus and an arithmetic circuit such as, for example, a CPU and an FPGA, and comprehensively controls operation of the on-board apparatus 20 by issuing an instruction and transferring data to respective components constituting the on-board apparatus 20 on the basis of programs and data stored in the on-board storage unit 22, and data, or the like, received from the ground apparatus 50. The on-board control unit 21 includes a traveling information measuring unit 211, a with-ground data transmission and reception processing unit 212, a traveling control unit 214, a coupling detecting unit 216, an own train length updating unit 217, a temporary stop position calculating unit 218, and an on-board side relay processing unit 219. Each functional unit provided at the on-board control unit 21 may be implemented with individual arithmetic circuits or may be individually implemented by one arithmetic circuit through software arithmetic processing.

The traveling information measuring unit 211 measures a traveling location (a travel distance expressed with mileage) and traveling speed of the own train as needed on the basis of a detection signal of the speed generator that detects rotation speed of an axle. Further, in place of measurement of a location based on the detection signal of the speed generator, or in conjunction with measurement of a location based on the detection signal of the speed generator, the traveling location and the traveling speed of the own train may be measured using a measurement value by a satellite positioning system such as a GPS (Global Positioning System).

The with-ground data transmission and reception processing unit 212 performs control of receiving the ground information transmitted from the ground apparatus 50 through polling communication, that is ground information in which the destination train ID is the own train ID 222 via the on-board radio communication equipment 26. Then, in the case where the with-ground data transmission and reception processing unit 212 receives the ground information, the with-ground data transmission and reception processing unit 212 performs control of generating train information in which the transmission source ground apparatus ID is set as the destination ground apparatus ID and transmitting the train information via the on-board radio communication equipment 26.

The with-ground data transmission and reception processing unit 212 includes a train occupancy range calculating unit 213. The train occupancy range calculating unit 213 calculates train occupancy range information in accordance with the traveling location of the own train measured by the traveling information measuring unit 211 on the basis of the train length information 227. Specifically, upon normal traveling, the train occupancy range calculating unit 213 calculates the train occupancy range information on the basis of the train length information 227 in which the number of vehicles 223 of the own train is set. Meanwhile, in the case where the failure train 2 is coupled to the own train that is the rescue train 2, and the own train length updating unit 217 updates the train length information 227, the train occupancy range calculating unit 213 calculates the train occupancy range information on the basis of the updated train length information 227, that is, the number of vehicles of a series of trains in which the failure train 2 is coupled.

The traveling control unit 214 performs traveling control of the own train as needed using the coming-in allowable range in the ground information (ground information in which the transmission source ground apparatus ID is a counterpart ground apparatus ID 225) received from the ground apparatus (counterpart ground apparatus) 50 in the control section 10 in which the own train is located. The traveling control itself can be realized using a publicly known technique, and, for example, traveling of the own train is controlled in accordance with a speed check pattern in which a train stops at a coming-in limit position determined by the coming-in allowable range. The traveling control unit 214 includes a temporary stop control unit 215.

The temporary stop control unit 215 drives the braking mechanism 27 to cause the own train to stop at the temporary stop station so that the stop position of the own train becomes the temporary stop position 236 when the own train operates as the rescue train 2 and arrives at the temporary stop station.

The coupling detecting unit 216 detects coupling of the failure train 2 with respect to the head vehicle or the tail vehicle of the own train. At this time, if a coupling signal is input from the coupler 29 of the downbound end vehicle, "downbound" is set as the relative coupled position 232, and if the coupling signal is input from the coupler 29 of the upbound end vehicle, "upbound" is set as the relative coupled position 232 in the rescue information 230.

In the case where the coupling detecting unit 216 detects coupling of the failure train 2, the own train length updating unit 217 calculates the number of vehicles obtained by adding the number of vehicles of the failure train in the rescue command information received through polling communication to the number of vehicles 223 of the own train, and updates the train length information 227.

The temporary stop position calculating unit 218 calculates the temporary stop position at the temporary stop station in accordance with the relative coupled position detected by the coupling detecting unit 216. Then, the calculated temporary stop position 236 is set in the rescue information 230.

The on-board side relay processing unit 219 is a functional unit that performs processing in the case where the counterpart ground apparatus 50 is the station ground apparatus 50b. That is, the on-board side relay processing unit 219 transfers the platform screen door information received from the station ground apparatus 50b through polling communication to the vehicle door control apparatus 28 along with the transmission source ground apparatus ID in each case.

The on-board storage unit 22 is implemented with a storage medium such as an IC memory, a hard disk and an optical disk. In the on-board storage unit 22, programs for causing the on-board apparatus 20 to operate and realizing various functions provided at the on-board apparatus 20, and data, or the like, to be used during execution of the programs are stored in advance, or temporarily stored every time processing is performed. In the present embodiment, in the on-board storage unit 22, an on-board program 221, an own train ID 222, the number of vehicles 223, ground apparatus information 224, a counterpart ground apparatus ID 225, traveling information 226, train length information 227, and rescue information 230 are stored.

The on-board control unit 21 realizes functions of the traveling information measuring unit 211, the with-ground data transmission and reception processing unit 212, the traveling control unit 214, the coupling detecting unit 216, the own train length updating unit 217, the temporary stop position calculating unit 218, the on-board side relay processing unit 219, or the like, by reading out and executing the on-board program 221 from the on-board storage unit 22. In the own train ID 222, a train ID of the own train is set. In the number of vehicles 223, the number of vehicles constituting the own train is set.

The ground apparatus information 224 is a list of the ground apparatuses 50 disposed along the track 1, and is referred to by the on-board apparatus 20 to specify the counterpart ground apparatus 50, or the like. For example, a range of the corresponding control section 10 (a boundary location with the adjacent control section 10), a range of the radio communication control region 70 of the corresponding ground apparatus 50, or the like, are set in association with the ground apparatus ID. Further, information as to whether the ground apparatus 50 is the ground apparatus 50a or the station ground apparatus 50b, information of the station stop position determined at the station 100 within the corresponding control section 10 in the case where the ground apparatus 50 is the station ground apparatus 50b, or the like, are included.

In the counterpart ground apparatus ID 225, a ground apparatus ID of the counterpart ground apparatus 50 that is a ground apparatus 50 in the control section 10 in which the own train is located, is set. The counterpart ground apparatus ID 225 is rewritten every time the own train has reached the boundary location of the control section 10. A boundary location with the next control section 10, and a ground apparatus ID of the next ground apparatus 50 that becomes a new counterpart ground apparatus 50 can be specified from the ground apparatus information 224.

The traveling information 226 includes the traveling location and the traveling speed of the own train and is rewritten as needed with the latest traveling location and traveling speed measured as needed by the traveling information measuring unit 211. In the train length information 227, the number of vehicles 223 is set as an initial value, and is updated to the number of vehicles obtained by adding the number of vehicles of the failure train 2 after coupling of the failure train 2 is detected.

The rescue information 230 is set in the train information as the rescue information illustrated in FIG. 5 upon polling communication after the failure train 2 is coupled to the rescue train 2. The rescue information 230 includes a failure train ID 231, a relative coupled position 232, the number of vehicles of a rescue train 233, the number of vehicles of a failure train 234, a temporary stop station 235, and a temporary stop position 236. The number of vehicles of the rescue train 233 is the number of vehicles of the own train, and the number of vehicles 223 is set. In the failure train ID 231, a failure train ID in the rescue command information received through polling communication is set, in the number of vehicles of the failure train 234, the number of vehicles of the failure train in the rescue command information is set, and, in the temporary stop station 235, the temporary stop station in the rescue command information is set.

Processing Flow

The processing flow of the ground apparatus 50 and the on-board apparatus 20 in the present embodiment will be described below. Note that the processing that will be described below is realized by the ground control unit 52 reading out and executing the ground program 541 from the ground storage unit 54 at the ground apparatus 50, and the on-board control unit 21 reading out and executing the on-board program 221 from the on-board storage unit 22 at the on-board apparatus 20.

Figure 12:
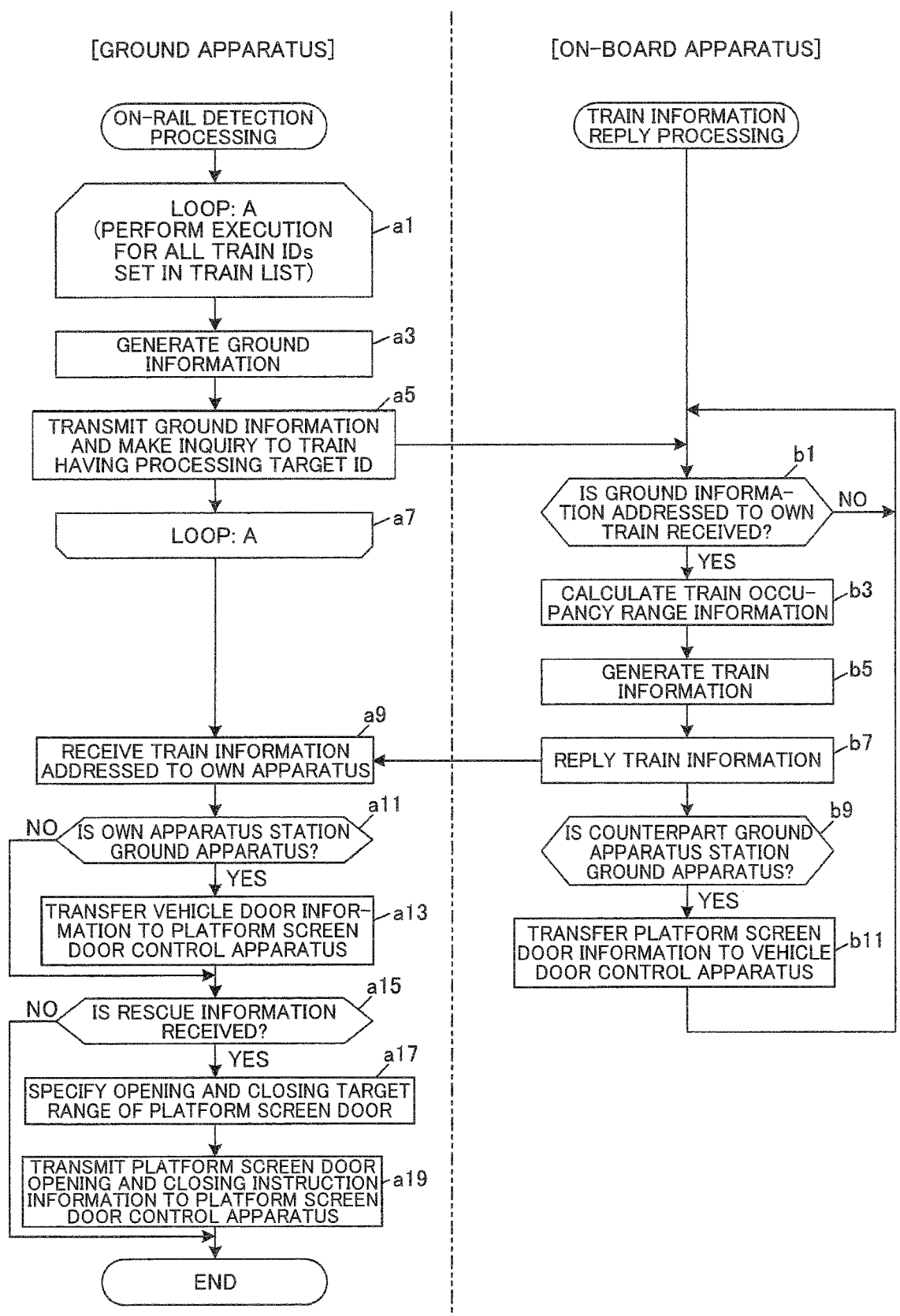
FIG. 12 illustrates a flowchart of on-rail detection processing to be performed by each ground apparatus and train information reply processing of the on-board apparatus in association with the on-rail detection processing.

First, flow of on-rail detection processing to be performed by each ground apparatus 50 and train information reply processing of the on-board apparatus 20 in association with the on-rail detection processing will be described with reference to FIG. 12. At each ground apparatus 50, the on-rail detection processing is repeated with an inquiry period in accordance with frequency upon on-rail detection in the case where the ground apparatus 50 is the ground apparatus 50a, and is repeated with an inquiry period in accordance with frequency upon relay in the case where the ground apparatus 50 is the station ground apparatus 50b.

In the on-rail detection processing, the on-rail detection processing unit 521 repeats processing of loop A while sequentially setting all the train IDs set in the train list 543 as a processing target ID, and performs one-time polling communication (step a1 to step a7). That is, the on-rail detection processing unit 521 generates ground information to be transmitted to the train 2 having the processing target ID while setting the processing target ID as the destination train ID and setting the own apparatus ID 542 as the transmission source ground apparatus ID (step a3). At this time, in the case where the ground apparatus 50 is the station ground apparatus 50b, the platform screen door information transmitted as needed from the platform screen door control apparatus 60 is set in the ground information. Further, in the case where a notification of the rescue command information in which the processing target ID is set as the rescue train ID is made from the command apparatus 90, the rescue command information is set in the ground information. Then, the on-rail detection processing unit 521 makes an inquiry to the train 2 having the processing target ID by transmitting the generated ground information via the radio base station 51 (step a5).

Every time the inquiry is made, at the on-board apparatus 20, the with-ground data transmission and reception processing unit 212 performs train information reply processing. That is, the with-ground data transmission and reception processing unit 212 performs control of receiving ground information addressed to the own train from the ground apparatus 50. While the transmission source ground apparatus 50 is a counterpart ground apparatus 50 in principle, in the case where the own train is passing through a region where the radio communication control regions 70 overlap with each other, ground information can be exceptionally received from the next ground apparatus 50.

Then, in the case where there is polling communication by the ground apparatus 50, and the ground information addressed to the own train is received (step b1: Yes), the train occupancy range calculating unit 213 calculates train occupancy range information (step b3). The with-ground data transmission and reception processing unit 212 then generates train information to be replied while setting the transmission source ground apparatus ID of the received ground information as the destination ground apparatus ID and setting the own train ID 222 as the transmission source train ID (step b5). At this time, in the case where the counterpart ground apparatus 50 is the station ground apparatus 50*b*, the vehicle door information transmitted as needed from the vehicle door control apparatus 28 is set in the train information. Further, in the case where the rescue information 230 is set, the rescue information 230 is set in the train information. The with-ground data transmission and reception processing unit 212 then transmits the generated train information via the on-board radio communication equipment 26 (step b7).

Thereafter, in the case where the counterpart ground apparatus 50 is the station ground apparatus 50*b*, and the platform screen door information is set in the ground information received in step b1 (step b9: Yes), the on-board side relay processing unit 219 transfers the platform screen door information to the vehicle door control apparatus 28 along with the transmission source ground apparatus ID (step b11).

Meanwhile, at the ground apparatus 50, the on-rail detection processing unit 521 performs control of receiving the train information addressed to the own apparatus (step a9). Then, in the case where the ground apparatus 50 is the station ground apparatus 50*b*, and the vehicle door information is set in the train information received in step a9 (step a11: Yes), the ground side relay processing unit 522 transfers the vehicle door information to the platform screen door control apparatus 60 along with the transmission source train ID (step a13).

Further, in the case where the rescue information is set in the train information received in step a9 (step a15: Yes), the door range calculating unit 523 specifies an opening and closing target range of the platform screen door 111 using the number of vehicles of the failure train (step a17). The door range calculating unit 523 then transmits the platform screen door opening and closing instruction information in which the specified opening and closing target range is set to the platform screen door control apparatus 60 (step a19).

Figure 13:
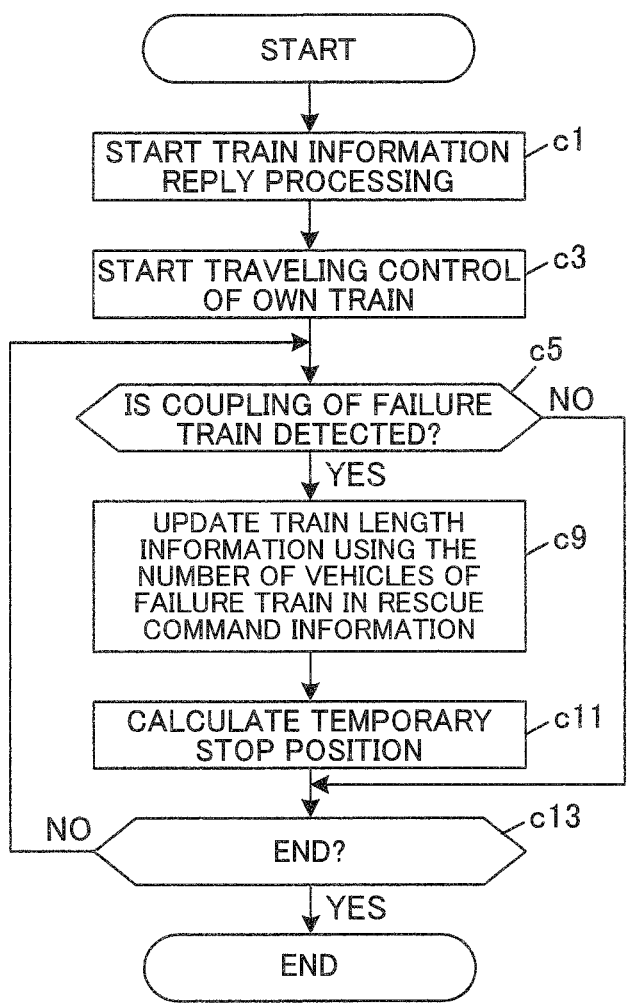
FIG. 13 illustrates a flowchart of overall processing of the on-board apparatus.

Overall processing flow to be performed by the on-board apparatus 20 will be described next with reference to FIG. 13. As illustrated in FIG. 13, at the on-board apparatus 20, first, the with-ground data transmission and reception processing unit 212 starts train information transmission processing (step c1). The traveling control unit 214 then starts traveling control of the own train (step c3). The traveling control started here is performed using the traveling control information such as the coming-in allowable range received through polling communication. During this process, when the own train operates as the rescue train 2 and arrives at the temporary stop station, the temporary stop control unit 215 stops the own train at the temporary stop position calculated in step c11.

Thereafter, the coupling detecting unit 216 monitors coupling of the failure train 2. Then, if coupling of the failure train 2 and a relative coupled position are detected (step c5: Yes), the own train length updating unit 217 updates the train length information 227 using the number of vehicles of the failure train in the rescue command information (step c9). Further, the temporary stop position calculating unit 218 calculates the temporary stop position (step c11).

Then, until the present processing is finished such as upon shutdown (step c13: No), the processing returns to step c5, and the above-described processing is repeated.

As described above, according to the present embodiment, even in the case where the own train operates as the rescue train 2, and the failure train 2 is coupled, it is possible to properly recognize a range on the track where a series of coupled trains can exist in either case of traction traveling and propelling traveling, so that it is possible to realize safe traveling control of trains.

Figure 14:
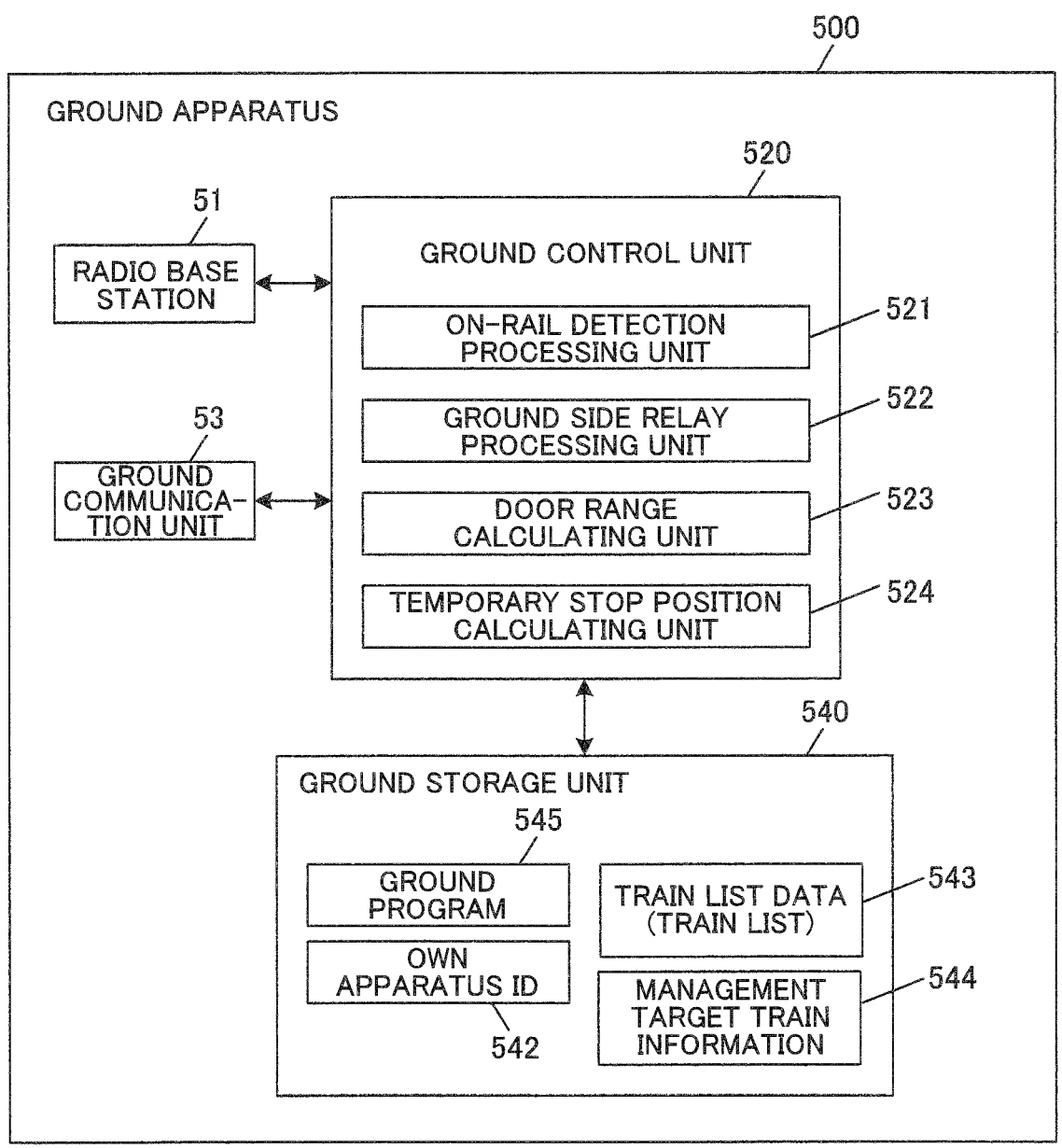
FIG. 14 illustrates a block diagram of a functional configuration example of a ground apparatus in a modified example.

Note that, while, in the above-described embodiment, the on-board apparatus 20 of the rescue train 2 calculates the temporary stop position at the temporary stop station, the ground apparatus 50, for example, the station ground apparatus 50*b* whose corresponding control section 10 includes the temporary stop station may calculate the temporary stop position at the temporary stop station. FIG. 14 illustrates a block diagram of a functional configuration example of the ground apparatus 500 in the present modified example. Note that, in FIG. 14, the same reference numerals are assigned to components similar to those in the above-described embodiment.

As illustrated in FIG. 14, at the ground apparatus 500 in the present modified example, the ground control unit 520 includes an on-rail detection processing unit 521, a ground side relay processing unit 522, a door range calculating unit 523, and a temporary stop position calculating unit 524. Further, at the ground apparatus 500, in the ground storage unit 540, a ground program 545, an own apparatus ID 542, train list data 543, and management target train information 544 are stored. The ground control unit 520 realizes functions of the on-rail detection processing unit 521, the ground side relay processing unit 522, the door range calculating unit 523, the temporary stop position calculating unit 524, or the like, by reading out and executing the ground program 545 from the ground storage unit 540. Among them, the temporary stop position calculating unit 524 calculates the temporary stop position from the station stop position at the temporary stop station, the number of vehicles of the rescue train and the number of vehicles of the failure train in the rescue information received through polling communication in a similar manner to that in the above-described embodiment.

Further, in the above-described embodiment, when the rescue train 2 stops at the temporary stop station, the temporary stop position of the rescue train 2 is calculated so that the coupled failure train 2 stops at the station stop position determined at the corresponding station 100. Meanwhile, the temporary stop position does not always have to be determined so that the failure train 2 stops at the station stop position, and it is only necessary that the failure train 2 stops at a position where passengers of the failure train 2 can get off at the temporary stop station, specifically, a position where the failure train 2 falls within a range of the platform 11 in which the failure train 2 comes and the vehicle door of the failure train 2 faces the platform screen door 111. Therefore, the temporary stop position of the rescue train 2 can be obtained from vehicle composition information of a series of coupled trains determined by the relative coupled position, the number of vehicles of the rescue train, and the number of vehicles of the failure train, and the station stop position. Further, the opening and closing target range of the platform screen door 111 in this case can be calculated from the above-described vehicle composition information of a series of trains and the temporary stop position.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An on-board apparatus that performs radio communication with a ground system,
   the ground system being a system that generates traveling control information of each train using train occupancy range information of each train and transmits the traveling control information to the train, the on-board apparatus comprising:

a storage unit that stores base train length information that is train length information of a base train on which the on-board apparatus is mounted;

a calculating unit that calculates train occupancy range information using a traveling location of the base train measured by a traveling location measuring unit and the base train length information;

a communication control unit that controls transmission of the train occupancy range information calculated by the calculating unit to the ground system and reception of the traveling control information from the ground system;

a traveling control unit that controls train traveling on a basis of the received traveling control information; and a coupling detecting unit that detects a relative coupled position of a failure train with respect to the base train and coupling of the failure train while setting the base train as a rescue train, wherein, in a case where detection is performed by the coupling detecting unit, the calculating unit calculates the train occupancy range information by obtaining a head position and a tail position of a series of coupled trains using the traveling location, the base train length information, failure train length information that is train length information of the failure train, and the relative coupled position, and in a case where detection is performed by the coupling detecting unit, the traveling control unit controls traveling of the series of coupled trains.

2. The on-board apparatus according to claim 1, wherein passengers are on board the failure train, and the traveling control unit includes a temporary stop control unit that, upon control of stopping at a given station at which passengers of the failure train are allowed to get off, (1) calculates a temporary stop position at which the passengers of the failure train can get off at the station using a predetermined station stop position determined at the station and the relative coupled position, and (2) performs control of stopping the train at the temporary stop position.

3. The on-board apparatus according to claim 2, wherein, in a case where the relative coupled position at which the failure train is coupled is ahead of the base train, the temporary stop control unit calculates a position posterior to the station stop position by an amount corresponding to a train length indicated in the failure train length information as the temporary stop position, and, in a case where the relative coupled position at which the failure train is coupled is behind the base train, calculates a position anterior to the station stop position by an amount corresponding to a train length indicated in the base train length information as the temporary stop position.

4. The on-board apparatus according to claim 2, wherein a platform screen door is provided at the station, the ground system (a) receives vehicle composition information and the temporary stop position from the train, and (b) generates platform screen door opening and closing instruction information and transmits the platform screen door opening and closing instruction information to a control apparatus of the platform screen door upon the stop, the platform screen door opening and closing instruction information being information designating an opening and closing target range of the platform screen door in which the failure train is to be located in a case where the train stops at the temporary stop position, and the on-board apparatus further comprises:

a transmission control unit that performs control of transmitting the failure train length information to the ground system upon the stop.

5. The on-board apparatus according to claim 3, wherein a platform screen door is provided at the station, the ground system (a) receives vehicle composition information and the temporary stop position from the train, and (b) generates platform screen door opening and closing instruction information and transmits the platform screen door opening and closing instruction information to a control apparatus of the platform screen door upon the stop, the platform screen door opening and closing instruction information being information designating an opening and closing target range of the platform screen door in which the failure train is to be located in a case where the train stops at the temporary stop position, and the on-board apparatus further comprises:

a transmission control unit that performs control of transmitting the failure train length information to the ground system upon the stop.

6. A ground system that acquires the train composition information from the on-board apparatus according to claim 1 and transmits the traveling control information to the on-board apparatus, the on-board apparatus including a train composition information setting unit that sets train composition information of a series of coupled trains, including the base train length information, the failure train length information, and the relative coupled position, the ground system comprising:

a temporary stop position calculating unit that, in order to stop the train at a given station at which passengers who are on board the failure train are allowed to get off, calculates a temporary stop position at which passengers of the failure train can get off at the station using a predetermined station stop position determined at the station and the train composition information; and a transmission control unit that transmits the traveling control information including information of the temporary stop position.

7. The ground system according to claim 6, wherein, in a case where the relative coupled position included in the train composition information is ahead of the base train, the temporary stop position calculating unit calculates a position posterior to the station stop position by an amount corresponding to a train length indicated in the failure train length information as the temporary stop position, and, in a case where the relative coupled position is behind the base train, calculates a position anterior to the station stop position by an amount corresponding to a train length indicated in the base train length information as the temporary stop position.

* * * * *